(12) United States Patent
Kojima

(10) Patent No.: US 7,117,982 B2
(45) Date of Patent: Oct. 10, 2006

(54) SHOCK ABSORBER

(75) Inventor: Shigeru Kojima, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 10/863,254

(22) Filed: Jun. 9, 2004

(65) Prior Publication Data
US 2004/0251098 A1 Dec. 16, 2004

(30) Foreign Application Priority Data
Jun. 13, 2003 (JP) .............................. 2003-168872

(51) Int. Cl.
*F16F 9/00* (2006.01)
(52) U.S. Cl. .............................. 188/322.19; 188/321.11
(58) Field of Classification Search .......... 188/321.11, 188/322.19; 267/216, 221
See application file for complete search history.

(56) References Cited

U.S. PATENT DOCUMENTS

| | | | | |
|---|---|---|---|---|
| 3,251,591 A | * | 5/1966 | McNally | 267/221 |
| 3,263,983 A | * | 8/1966 | Bliven | 267/220 |
| 3,731,958 A | * | 5/1973 | Offenbroich | 403/280 |
| 3,761,116 A | * | 9/1973 | Scheitlin et al. | 285/192 |
| 3,877,687 A | * | 4/1975 | Sarti | 267/195 |
| 4,030,713 A | * | 6/1977 | Palmer | 267/221 |
| 4,145,036 A | * | 3/1979 | Moonen et al. | 267/221 |
| 4,562,997 A | * | 1/1986 | Iwata et al. | 267/221 |
| 4,913,268 A | * | 4/1990 | Parker et al. | 188/322.19 |
| 5,553,713 A | * | 9/1996 | Sydekum et al. | 267/221 |
| 6,082,720 A | * | 7/2000 | Ducloux et al. | 267/221 |
| 6,217,012 B1 | * | 4/2001 | Hashirayama | 267/221 |
| 6,341,678 B1 | * | 1/2002 | Hoyte et al. | 188/321.11 |
| 6,692,012 B1 | * | 2/2004 | Fullenkamp et al. | 280/124.154 |

FOREIGN PATENT DOCUMENTS

| JP | 7280018 | * 10/1995 |
|---|---|---|
| JP | 2002-195331 | 7/2002 |
| KR | 2003096620 | * 12/2003 |

* cited by examiner

*Primary Examiner*—Devon Kramer
(74) *Attorney, Agent, or Firm*—Rabin & Berdo, PC

(57) ABSTRACT

A shock absorber includes a cylindrical shock absorber body, a mounting portion (4) disposed bulgingly in an outer surface of the shock absorber body, and a spring seat (3) inserted into the shock absorber body and engaged with the mounting portion (4), supporting a suspension spring. The mounting portion (4) has, on the top face, a flat face portion perpendicular to an axis of the shock absorber body. The spring seat (3) includes a cylindrical seat body (15), a seat portion (16) projected from an outer side of the cylindrical seat body (15) and an engagement portion (18) projected from an inner side of the cylindrical seat body (15). Further a travel stop device is disposed between the spring seat (3) and the mounting portion (4), thereby to stop relative rotation and upward/downward-direction travel thereof.

6 Claims, 4 Drawing Sheets

SHOCK ABSORBER

FIELD OF THE INVENTION

The present invention relates to a shock absorber used for a suspension apparatus in a vehicle such as an automobile and more particularly to a mounting structure of a spring seat to a shock absorber body.

BACKGROUND OF THE INVENTION

Japanese Patent Publication No. A2002-195331 discloses what has been proposed as a conventional mounting structure of a spring seat to this kind of a shock absorber.

This mounting structure, as shown in FIG. 7, is constructed such that a spring seat 46 receiving a suspension spring is inserted in an outer surface of an outer shell 45 constituting a shock absorber body 40 and the spring seat 46 is secured in a predetermined position thereto. The spring seat 46 is formed of a seat body 42 having a insert bore 41 into which the outer shell 45 is inserted and a flange-shaped seat portion 43 extending in the outer direction of the seat body 42 where both the spring seat 46 and the outer shell 45 are secured to each other by fitting a circular bulged portion 44 formed in the outer shell 45 into the insert bore 41.

In this case, the bulged portion 44 is formed by bulge machining. Namely the circular bulged portion 44 is formed by enlarging the outer shell 45 from an inside of the outer shell 45 toward an outer diameter direction thereof by a tool, and as a result the bulged portion 44 has a circular cross section for reason of machining.

Therefore, when the insert bore 41 of the spring seat 46 is pressed into the bulged portion 44 of the outer shell 45, a force in the direction shown by the arrow X, that is, the force which reduces the outer shell 45 in diameter acts as a component force. The force in the same direction with the component force is produced likewise in case a load is applied on the seat portion 43 of the spring seat 46 due to compression of the suspension spring where the suspension spring is installed to the shock absorber and operates as force which reduces the outer shell 45 in diameter as described above.

Since this force acts as a force which is likely to deform the outer shell 45 inside, that raises the problem with strength of the outer shell 45 in the event of reducing it in thickness. Namely, the structure of the bulged portion 44 makes reduction in thickness of the outer shell 45 difficult.

SUMMARY OF THE INVENTION

Accordingly the present invention has an object of providing a shock absorber equipped with a mounting structure of a spring seat which enables weight saving of the shock absorber without reduction in strength of an outer shell.

In order to achieve the above-described object, a shock absorber for a vehicle according to the present invention comprises a cylindrical shock absorber body; a mounting portion disposed bulgingly in an outer surface of the shock absorber body; and a spring seat inserted into the shock absorber body and engaged to the mounting portion, supporting a suspension spring. The mounting portion has, as a top face thereof, a flat face portion perpendicular to an axis line of the shock absorber body. The spring seat includes a cylindrical seat body; a seat portion projected in an outer side of the cylindrical seat body and supporting the suspension spring; and an engagement portion projected in an inner side of the cylindrical seat body and engaged in the flat face portion of the mounting portion. Further a travel stop device is disposed between the spring seat and the mounting portion, to stop relative rotation and upward/downward-direction travel thereof.

The travel stop device preferably includes a projection projected from an inner face of the seat body and extending in parallel with an axis line of the shock absorber body, and a notch groove attached in the mounting portion and extending in parallel with the axis line of the shock absorber body, wherein the projection is pressed into the notch groove. The notch groove is preferably equipped with an oblique guide which is enlarged in width toward an insert side thereof.

These and other objects, features, aspects and advantages of the present invention will be become apparent to those skilled in the art from the following detailed description, which, taken in conjunction with the annexed drawings, discloses a preferred embodiments of the present invention.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention are provided for illustration only, and not for the purpose of limiting the invention as defined by the appended claims and their equivalents.

First Embodiment

A first embodiment where the present invention is applied to a strut type shock absorber used in a suspension apparatus for an automobile will be explained with accompanying drawings.

Figure 1:
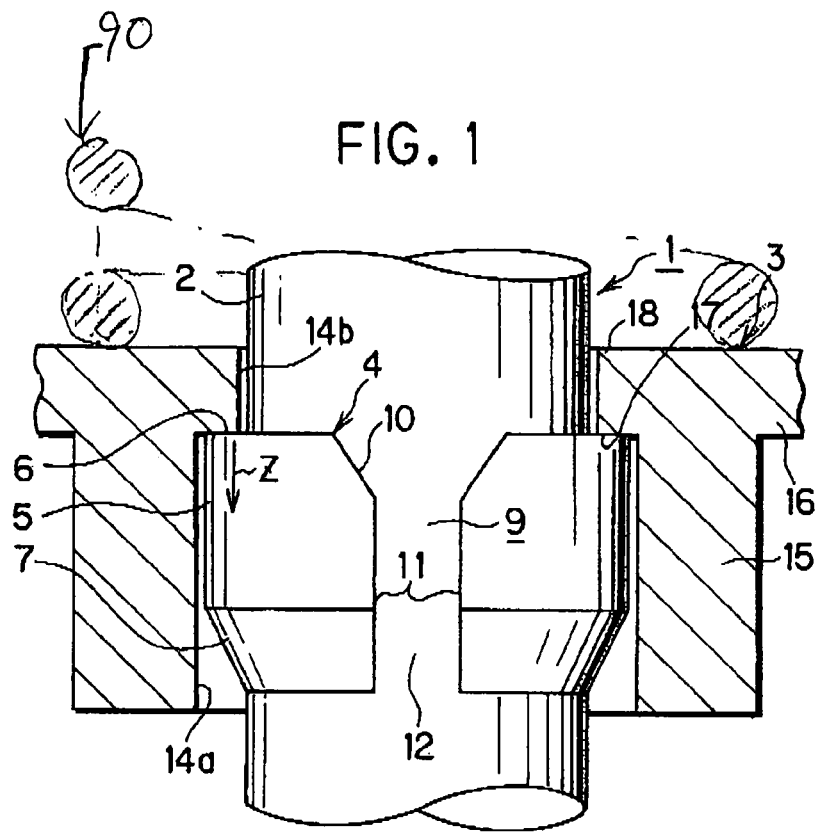
FIG. 1 is a cross section of a major part of a shock absorber of a first embodiment according to the present invention.
Figure 2:
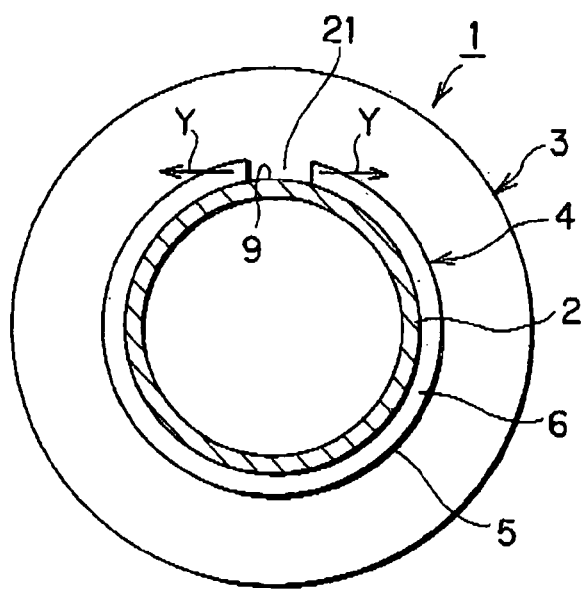
FIG. 2 is a plan view of FIG. 1.

A strut type shock absorber 1 shown in FIG. 1 and FIG. 2 is what is called a dual-tube type shock absorber which includes an inner shell (not shown) and an outer shell 2 as a shock absorber body positioned outside of the inner shell. A knuckle bracket (not shown) is disposed in a lower end of the outer shell 2 and a bulged portion 4 is formed in an outer surface in the vicinity of a top end of the outer shell 2 to install a spring seat 3 as a band-shaped mounting portion.

The bulged portion 4 is formed integral with the outer shell 2 and in this embodiment is formed integral therewith simultaneously when the outer shell 2 is formed of aluminum material.

The bulged portion 4 includes a cylindrical portion 5 formed in the same diameter, a flat end face 6 as a top face thereof having a plane perpendicular to an axis line of the outer shell 2, and a tapered diameter reduced-portion 7 in a lower side of the cylindrical portion 5 with the tapered diameter reduced-portion 7 being reduced gradually in an outer diameter toward the lower end thereof.

In the case of forming the bulged portion 4, a cylindrical base material of the same outer diameter with the bulged portion 4 is used and is left as the bulged portion 4 and portions other than it are molded to conform in thickness to the outer diameter of the outer shell 2 by cutting work. Or a cylindrical member which is equivalent to the bulged portion 4 may be pressed into the outer surface of the outer shell 2 or the cylindrical member may be inserted into the outer surface of the outer shell 2 and thereafter may be secured thereto by welding. In both situations, the bulged portion 4 is considered fixed to the outer shell.

A notch groove 9 in parallel with the axis line of the outer shell 2, namely extending in the upward/downward direction is formed in any part of the cylindrical portion 5 and the bottom of the notch groove 9 is formed of the outer surface of the outer shell 2 and an oblique guide portion 10 is disposed on a top side of the notch groove 9 so that the notch groove 9 is enlarged in width from both parallel side faces 11 to an upward direction. The curvature of the bottom 12 of the notch groove 9 is equal to the curvature of the outer surface of the outer shell 2.

A structure of the spring seat 3 mounted to the bulged portion 4 will be explained next.

The spring seat 3 is equipped with a cylindrical seat body 15 having an insert bore 14a to receive the bulged portion 4 in a predetermined clearance thereto, a flange-like seat portion 16 extending from a top end of the seat body 15 to an outer side thereof, and an engagement portion 18 extending from the top end to an inner side thereof likewise. A suspension spring (not shown) (coil spring) is adapted to be supported at a lower end thereof on the top face of the seat portion 16.

An insert bore 14b into which the outer shell 2 is inserted in a predetermined clearance is formed in an inner surface of the engagement portion 18 and on the other hand, a flat face portion 19 having a plane perpendicular to an axis line of the outer shell 2 is formed in a lower end of the engagement portion 18. The engagement portion 18 is adapted to be projected in length such that when the outer shell 2 is inserted into the insert bore 14b, the spring seat 3 does not fall off due to contact of the flat face portion 19 of the engagement portion 18 and the flat face portion 6 of the bulged portion 4.

Figure 3:
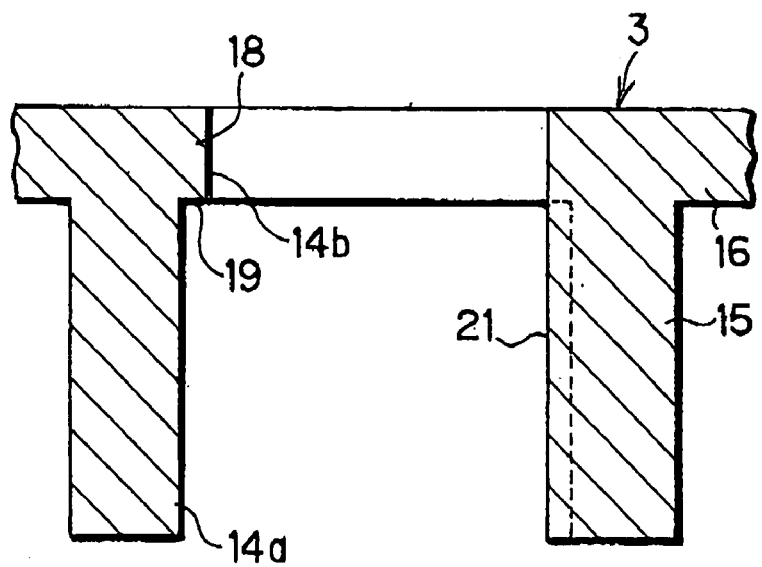
FIG. 3 is a cross section showing a spring seat.
Figure 4:
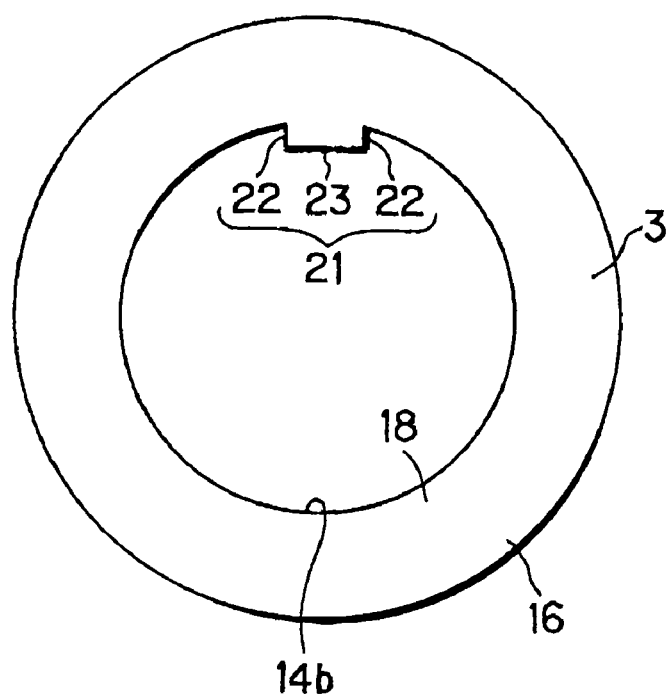
FIG. 4 is a plan view of FIG. 3.
Figure 5:
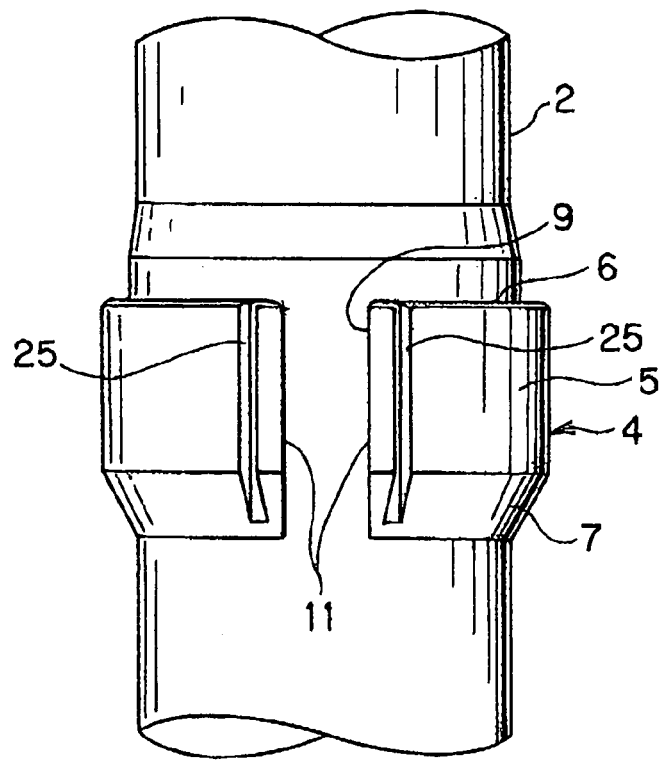
FIG. 5 is a cross section of a major part of a shock absorber of a second embodiment according to the present invention.

And as shown in FIG. 3 and FIG. 4, a projection 21 in parallel with an axis line of the shock absorber, namely extending upward/downward direction is formed to be projected toward an inner side on any part of the inner surface of the seat body 15 of the spring seat 3. The projection 21 includes both side faces 22 in parallel with each other and a crown face 23 having an arch face curvature of which is substantially equal to that of the outer surface of the outer shell 2. The width between both side faces 22 is slightly larger than the width of the notch groove 9 of the bulged portion 4, namely the width between both side faces 11.

Accordingly, when the outer shell 2 is inserted into the insert bore 14a of the seat body 15 and the projection 21 is inserted into the notch groove 9 of the bulged portion 4, the projection 21 is pressed into the notch groove 9 and then the spring seat 3 is designed to fixed without rotation and without upward/downward movement relative to the outer shell 2. Namely a travel stop device of the spring seat 46 comprises the notch groove 9 and the projection 21.

Accordingly in case the spring seat 3 is mounted to the outer shell 2, force produced when the projection 21 of the spring seat 3 is inserted into the notch groove 9 of the outer shell 2 becomes force in the direction (shown by the arrow Y in FIG. 2) perpendicular to the side face 11 of the notch groove 9 and therefore, is not applied to reduce the outer shell 2 in a diameter.

And in case the suspension spring is mounted to the shock absorber and as a result a load is applied on the seat portion 16 of the spring seat 3, the load is applied on the flat face portion 6 of the top face of the cylindrical portion 5 through the flat face portion 19 formed in the lower face of the engagement portion 18 of the seat body 15, but the force is applied in the axis line direction of the shock absorber (force in the arrow Z direction in FIG. 1) and does not work to reduce the outer shell 2 in a diameter either.

Thus, the force in the direction to reduce the outer shell 2 in a diameter is not produced both on mounting the spring seat 3 to the outer shell 2 and on operation of the suspension, which enables the thinner outer shell 2 and weight reduction of the shock absorber itself. And also the spring seat 3 is mounted to the outer shell 2 without rotation and without upward/downward movement relative thereto in a simple structure formed of the notch groove 9 and the projection 21 pressed into the notch groove 9, thereby to reduce a manufacturing cost. Since the oblique guide portion 10 is disposed on the top side of the notch groove 9 so that the notch groove 9 is enlarged in width in the upward direction, press work of the projection 21 to the notch groove 9 is easy to be performed.

Second Embodiment

A second embodiment of the present invention will be explained as follows.

The second embodiment differs from the first embodiment in the point that vertical grooves 25 as a deformation receiving portion extending in parallel with the axis line of the outer shell 2 are formed in the bulged portion 4 close to the notch groove 9.

Figure 6:
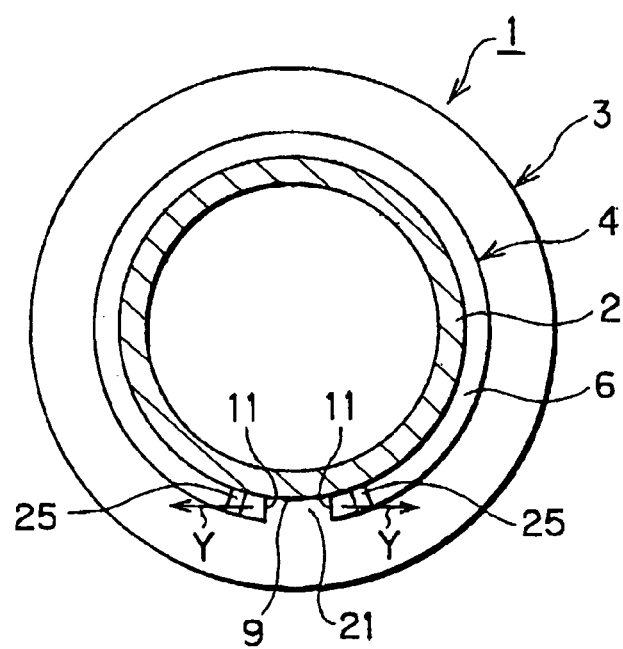
FIG. 6 is a partial plan view showing a state where a spring seat is pressed in FIG. 5.
Figure 7:
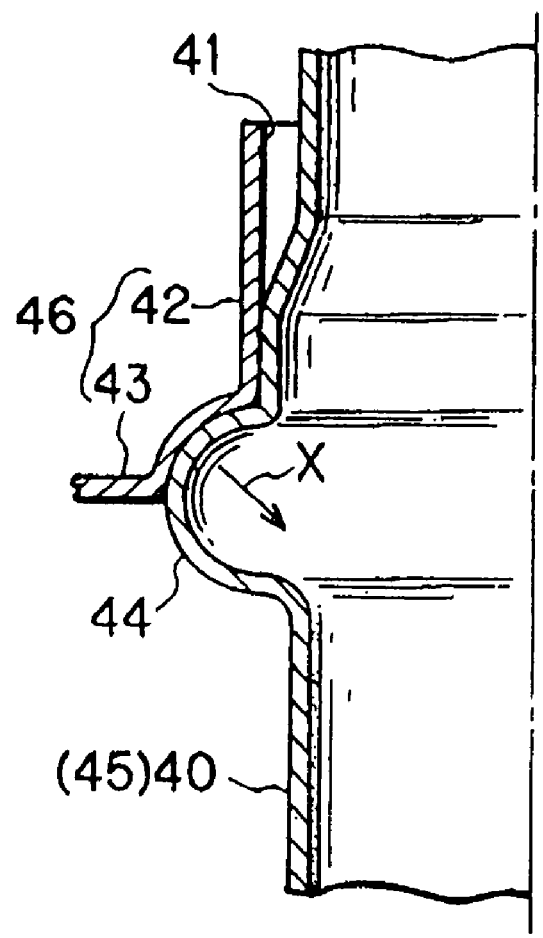
FIG. 7 shows a mounting structure of a spring seat to a conventional outer shell of a shock absorber and is a cross section of a major part showing the left side only from a center line of the outer shell.

Namely the vertical grooves 25 are formed respectively on both sides of the bulged portion 4 close to the notch groove 9, as well as formed to be like a concave shape in cross section having the same depth and length with the notch groove 9. Accordingly as the bulged portion 4 is pushed in the circumferential direction by the force shown in the arrow Y of FIG. 6 produced when the projection 21 of the spring seat 3 is pressed into the notch groove 9 of the outer shell 2, the vertical groove 25 is deformed in the direction of reducing the width thereof, thereby to absorb the force Y and prevent the deformation of the outer shell 2.

Since the vertical grooves 25 are disposed respectively close to both the sides of the notch groove 9 of the bulged portion 4, when the projection 21 is pressed into the notch groove 9, both the sides 11 of the notch groove 9 are easy to be deformed, as well as the deformation of the bulged portion 4 is allowed equally in both the sides of the notch groove 9. Therefore, press work of the projection 21 into the notch groove 9 is easy to be performed, as well as the projection 21 can be flexibly supported by both the sides 11 of the notch groove 9.

However, the present invention is not limited to each of the above-described embodiments and may be modified as follows.

In the above embodiments, the notch groove 9 is disposed in a side of the outer shell 2 and the projection 21 is disposed in a side of the spring seat 3, but in contrast it is appreciated that the notch groove 9 may be disposed in the side of the spring seat 3 and the projection 21 may be disposed in the side of outer shell 2. Also each number of the notch groove 9 and the projection 21 is not limited to one as shown in the embodiments, but may be more than one.

The bulged portion 4 is disposed integral with the outer shell 2 but the bulged portion 4 only may be separately formed and thereafter connected to outer shell 2. In both situations, the bulged portion 4 is considered fixed to the outer shell.

A dual-tube type shock absorber is disclosed herein but a single tube type shock absorber may be used.

Two vertical grooves 25 as the deformation receiving portion are disposed close to the notch groove 9 but one or a plurality of vertical grooves may be disposed in any part and may be like U-shape, or V-shape in cross section.

Further, in the embodiments the vertical groove 25 is shown as the deformation receiving portion, but is not limited thereto, but merely part of the concave portion or the bulged portion 4 may be made of material which is easy to be deformed.

This application claims priority to Japanese Patent Application No. 2003-168872. The entire disclosure of Japanese Patent Application No. 2003-168872 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A shock absorber for a vehicle, comprising:
   a cylindrical shock absorber outer shell, adapted to receive an inner shell therein;
   a mounting portion disposed bulgingly on an outer surface of the shock absorber outer shell, said mounting portion being fixed to the outer surface of the outer shell;
   a spring seat sleeved over the shock absorber outer shell and engaged to the mounting portion;
   a suspension coil spring sleeved over the shock absorber outer shell, the suspension coil spring having a lower end supported on said spring seat, wherein
   the mounting portion includes a cylindrical portion around the outer surface of the shock absorber outer shell, the cylindrical portion having, on a top face thereof, a flat face portion perpendicular to an axis line of the shock absorber outer shell, and
   the spring seat includes a cylindrical seat body positioned around the cylindrical portion of the mounting portion, a seat portion projecting from an outer side of the cylindrical seat body and supporting the suspension coil spring, and an engagement portion projecting from an inner side of the cylindrical seat body and engaged with the flat face portion of the mounting portion; and
   a travel stop device disposed between the spring seat and the mounting portion, to stop relative rotation and upward/downward-direction travel between the spring seat and the mounting portion, the travel stop device including
      a projection projected from an inner surface of the seat body and extending in parallel with the axis line of the shock absorber outer shell, the projection having a first width, and
      a notch groove disposed in the mounting portion and extending in parallel with the axis line of the shock absorber outer shell, the notch groove having a second width that is less than the first width, wherein the projection is press fit into the notch groove, to fix the projection within the notch groove.

2. The shock absorber as set forth in claim 1, wherein the notch groove includes an oblique guide portion where the notch groove is enlarged in width toward an insert side thereof.

3. The shock absorber as set forth in claim 1, wherein the mounting portion includes a deformation receiving portion which allows a deformation in the circumferential direction of the mounting portion caused by pressing the projection into the notch groove.

4. The shock absorber as set forth in claim 3, the deformation receiving portion includes a vertical groove formed in the mounting portion close to the notch groove.

5. A shock absorber for a vehicle, comprising:
   a cylindrical shock absorber outer shell, adapted to receive an inner shell therein;
   a mounting portion disposed bulgingly on an outer surface of the shock absorber outer shell, said mounting portion being fixed to the outer surface of the outer shell;
   a spring seat sleeved over the shock absorber outer shell and engaged to the mounting portion;
   a suspension coil spring sleeved over the shock absorber outer shell, the suspension coil spring having a lower end supported on said spring seat, wherein
   the mounting portion includes, on a top face thereof, a flat face portion, perpendicular to and surrounding an axis line of the shock absorber outer shell, and
   the spring seat includes a cylindrical seat body positioned around the mounting portion, a seat portion projecting from an outer side of the cylindrical seat body and supporting the suspension coil spring, and an engagement portion projecting from an inner side of the cylindrical seat body and having a flat faced bottom surface surrounding the axis line of the shock absorber outer shell and engaged therebelow with the flat face portion of the mounting portion; and
   a travel stop device disposed between the spring seat and the mounting portion, the travel stop device including
      a projection projected from an inner surface of the seat body and extending in parallel with the axis line of the shock absorber outer shell, the projection having a first width, and
      a notch groove disposed in the mounting portion and extending in parallel with the axis line of the shock absorber outer shell, the notch groove having a second width that is less than the first width, wherein the projection is press fit into and retained in the notch groove so that the spring seat is fixed without rotation and without upward/downward movement relative to the mounting portion.

6. A shock absorber for a vehicle, comprising:
   a cylindrical shock absorber outer shell, adapted to receive an inner shell therein;
   a mounting portion fixed bulgingly on an outer surface of the shock absorber outer shell, the mounting portion including a cylindrical portion around the outer surface of the shock absorber outer shell, the cylindrical portion having, on a top face thereof, a flat face portion perpendicular to an axis line of the shock absorber outer shell;

a suspension coil spring sleeved over the shock absorber outer shell; and a spring seat sleeved over the shock absorber outer shell, for supporting a lower end of the suspension coil spring, the spring seat including:
- a cylindrical seat body surrounding the cylindrical portion of the mounting portion,
- an engagement portion projecting toward the shock absorber outer shell axis line from an inner side of the cylindrical seat body and engaging the flat face portion of the mounting portion to be supported thereby, and
- a seat portion projecting from an outer side of the cylindrical seat body away from the shock absorber outer shell axis line and supporting the suspension spring; and a travel stop device disposed between the spring seat and the mounting portion, to stop relative rotation and upward/downward-direction travel between the spring seat and the mounting portion, wherein the travel stop device includes
- a projection projected from an inner surface of the seat body and extending in parallel with the axis line of the shock absorber outer shell, the projection having a first width, and
- a notch groove disposed in the mounting portion and extending in parallel with the axis line of the shock absorber outer shell, the notch groove having a second width that is less than the first width, wherein the projection is press fit into the notch groove, to fix the projection within the notch groove.

* * * * *